United States Patent Office 3,351,739
Patented Nov. 7, 1967

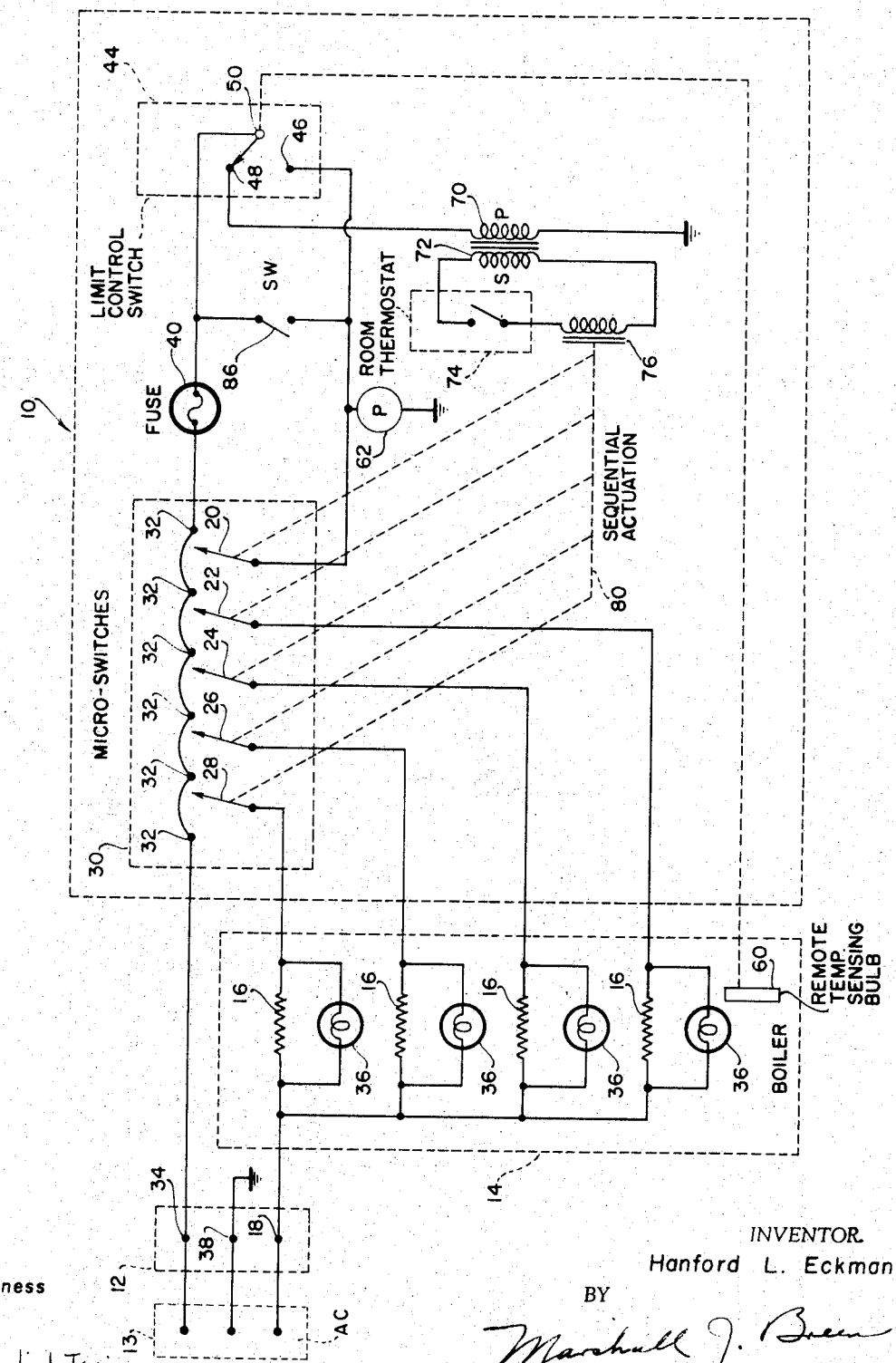

3,351,739
CONTROL SYSTEM FOR ELECTRICALLY HEATED BOILER
Hanford L. Eckman, Dallas, Pa., assignor to The Singer Company, New York, N.Y., a corporation of New Jersey
Continuation of application Ser. No. 449,250, Apr. 19, 1965. This application Nov. 21, 1966, Ser. No. 595,994
2 Claims. (Cl. 219—321)

ABSTRACT OF THE DISCLOSURE

A heating system including a boiler having a plurality of electric heaters therein and a pump for circulating water throughout the system. A relay, activated by a room thermostat sequentially actuates in a single continuous operation a plurality of switches to energize first the pump and then one by one the heaters when the relay is activated by the thermostat, and in like manner, to de-energize the heaters and pump in reverse order when the relay is deactivated. A limit switch, operable at a predetermined maximum boiler temperature, deactivates the relay and permits the pump to operate after the relay actuated switches are deenergized. A manual switch permits continuous operation of the pump.

---

This application is a continuation of my prior copending application for "Electro-Flo Hydronic Boiler Unit," Ser. No. 449,250, filed Apr. 19, 1965 and now abandoned.

One of the paramount features of the present invention is that it comprises an electrically heated boiler unit having electrical controls all of which comprise a small space and which is adaptable to be installed with facility and in which the use of the system requires a thermostat, among other components, so that the control and adjustment thereof is minimal. Further, the invention provides a unit that eliminates flames, smoke, fumes, and the causation of dust. The mounting and installation of the apparatus disclosed in accordance with the preferred embodiment of the invention requires a very small space and is even adaptable to being entirely mounted on a wall. The size of the electrically controlled and heated hot water heater unit is comparable to about the size of a portable television set, and is about as heavy as a conventional television set.

An object, therefore, of the present invention also is to provide a hydronic boiler unit having the controls capable of controlling and regulating the use of 6000 to 20,000 watts to heat the water which provides about 20,000 B.t.u. per hour to 70,000 B.t.u. per hour, and which weighs approximately one hundred pounds.

A further object of the present invention is to provide a centrally mounted hot water heating unit to provide constant, healthful and easily controlled temperatures throughout a home or office where such is installed, and to minimize much fuel waste and provide a completely clean, safe and efficient system.

The above and other objects and advantages of the invention will become apparent upon full consideration of the following detailed description and accompanying drawing in which the sole figure of the drawing is a schematic circuit diagram of the electrical circuit and the components thereof comprising the Electro-Flo Hydronic Boiler circuit control system of the preferred embodiment of the present invention.

Referring now to the drawings there is shown a control circuit 10 which is conected by terminal block 12 to a source 13 of 220 volts, three line single phase alternating current.

Terminal 12 shows the center connection terminal to be the neutral line and this is conveniently shown connected to ground for purposes of simplifying the schematic circuit diagram.

A boiler 14 is shown having a series of Chromalox electrically energized heating elements 16, 16, 16 disposed in the boiler, having one terminal thereof commonly connected to a post 18 of a terminal block 12, and in which the other side of the heating elements 16, 16 are connected to respective terminals 22, 24, 26, 28 of microswitches, or small displacement sensitive switches, 30 and which the associated terminals 32 thereof are connected to post 34 of terminal block 12. All of the terminals 32 are connected in common.

There are connected in shunt relation to each of the heating elements 16, 16 an indicator light 36, 36 respectively for indicating the electrical condition as to whether the heating elements are actually energized through the microswitches from the terminal block 12. The neutral line 38 of the terminal block 12 is connected to ground as shown.

Connected to the terminal 32 which is connected directly to terminal post 34 of the terminal block 12, there is connected a Fusestat fues 40 to provide over-current regulation of the control circuit components which comprise the circuit 10. In series with the fuse 40 also is a limit control switch 44 having terminals 46, 48, 50, terminal 46 being shown as connected to terminal 20 of the microswitches 30.

The limit control switch 44 is a single-pole-double-throw limit control switch in which terminals 48–50 are normally closed, but upon certain conditions, such as when a given temperature or other limit is reached, such as were a limit of 180°, or the like, is attained as a set condition, the switch is thrown from terminal 48 to terminal 46. The limit control switch 44 may be a remote bulb Aquastat controller L 6008A as manufactured by the Honeywell Regulator Company. The limit control switch is actuable by a given temperature condition as is remotely sensed by a remote temperature sensing bulb 60 that is immersed in the boiler 14. This remote bulb immersion-type controlled operates in response to temperature changes in hydronic heating systems and provides single-pole-double-throw switching for a three wire circuit application, providing limit and circulator control for a pump 62. Thus, it is seen that the pump 62 is energizable upon closure of terminal 20 with terminal 32 and also is energized separately upon attainment of the limit condition, which in the given example may be 180°, so that at that limit, the contact 50 is opened with terminal 48 and closes with terminal 46, so that at a given high condition, as sensed by the remote temperature bulb 60, the pump 62 protectively provides circulation of the boiler water throughout the system until the temperature drops below the limit condition as sensed by the bulb 60.

The limit control switch 44 has its terminal 48 connected to a transformer primary winding 70 which energizes a secondary winding 72 so that a complete secondary circuit provides a room control thermostat 74 in series with a solenoid-microswitches relay 76 connected in series with the secondary winding 72. The solenoid-micro-switches relay 76 may be an electric heating relay, such as a Honeywell R8154 relay, which provides, upon its energization, such as by secondary winding 72 and closure of the contacts of the room thermostat 74, sequential actuation and closure of terminals 20, 22, 24, 26, 28 sequentially with terminals 32, 32, etc., so that the switches of the micro-switch are snapped into circuit relation for sequence operation of bringing the heating elements 16, 16, etc., into circuit relation without current surge and thus reduce the current inrush when the heating elements are sought to be energized by actuation of the micro-switches 30. As can be understood from the drawing, when the limit control switch 44 is actuated upon attainment of the limit condition, as explained in the preceding paragraph, and continuity between the terminals 50 and 48 is broken, the transformer is deenergized thereby deactivating the solenoid-micro-switches relay 76.

The electric heating relay above referred to is used with the two-wire, low voltage thermostat, such as thermostat 74, and a remote mounted transformer 70, 72 to provide control for the multi-stage heating elements of the boiler 14, and it is noted that the progress in switch-closing of the micro-switches 30 progresses from terminal 20–32 thru 28–32 in sequential fashion, the closing being accomplished in and during respective each alternate cycle of the alternating current applied through to terminal block 12, i.e., the time interval between the closure of each of the switch terminals 20–32 through 28–32 is measured by the passage of one cycle of alternating current. The circuit schematic diagram of FIG. 1 shows that the relay element 76 provides sequential actuation of the switch terminals 20–32 thru 28–32, through a sequential switch actuating means as schematically shown by dotted lines 80. It is of course within the purview of the present invention to provide a multi-stage micro-switch of longer periods of actuation or even of slightly shorter periods of actuation than the one cycle delay in the progressive closing of the switch contacts of the micro-switch 30, and it is further within the purview of the present invention to provide the sequential actuation 80 by known equivalent means for progressively or closing step-by-step a series of circuits for energizing a multi-stage load in order to reduce current inrush when the load is energized.

The pump 62 for circulating the water throughout the heating system to which the boiler 14 is connected, said system providing a return of the heated water to the boiler, is energized upon either closure of contacts 20–32 by the micro-switch 30, or by limit actuation of the control switch 44 in which contacts 50–46 are closed, as above described, or by a manual closure of switch 86, which provides a direct current path from the fuse 40 and the terminal 34 directly through pump 62 so that the pump is actively energized.

Thus, it is seen that when the environmental condition about the room thermostat 74 becomes sufficiently cool, the thermostat 74 is caused to close, performing a complete loop and circuit for secondary winding 72 so that there commences a sequential actuation and closure of all of the multi-stages 20–32 thru 28–32 of micro-switch 30, so that in this way pump 62 becomes energized, and the load or heating elements 16, 16, 16, 16 sequentially become energized without any substantial overload of the current supplied from terminal board 12, and in this way the water in the boiler 14 is commenced to be heated. The pump 62, in a well known manner, provides circulation of the hot water in the boiler 14, and eventually the environmental temperature of the room in which room thermostat 74 is located is elevated to the point where the micro-switches 30 are opened. Micro-switches 30 being opened, pump 62 is disconnected from the circuit, unless the limit conditions of control switch 44 are reached, in which case the pump continues to circulate until the limit conditions of control switch 44 are not exceeded and then pump 62 is taken out of the line circuit.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

Having thus described the nature of this invention, what is claimed herein is:

1. A control system for an electric hot water house heating system having a boiler, a plurality of electric heating elements mounted within said boiler to heat the water therein and pump means for circulating the water through a predetermined path in the electric hot water house heating system, said control system comprising a source of electrical energy utilizing alternating current and means for selectively energizing and deenergizing said plurality of heating elements and said pump means comprising switch means for sequentially energizing in a single complete continuous operation first said pump means and then one by one all of said heating elements and sequentially deenergizing in a single complete continuous operation one by one all of said heating elements and then said pump means, said switch means including a plurality of small displacement sensitive switches, solenoid relay means and sequential switch actuation means responsive to said relay means for sequentially actuating said small displacement sensitive switches, an electrical transformer having a primary and a secondary coil, a room thermostat connected in series with the secondary coil of said electrical transformer and the solenoid of said solenoid relay means, a limit control switch, temperature sensing means responsive to the temperature of the water in the boiler for actuating said limit control switch at a predetermined maximum water temperature, said limit control switch having a pair of circuit closing positions, said first limit control switch position being effective below said predetermined maximum water temperature to complete a circuit between said transformer primary coil and said source of electrical energy and said second limit control switch position being effective at said predetermined maximum water temperature to actuate said pump means to maintain the water circulation until the water temperature as sensed by said temperature sensing means drops below said predetermined maximum temperature, whereby said thermostat activates said solenoid relay means when the thermostat environment reaches a predetermined low temperature thereby rapidly energizing said pump means and all of said heating elements in sequence and said thermostat deactivates said solenoid relay means when said thermostat environment reaches a predetermined high temperature thereby rapidly deenergizing all of said heating elements and said pump means in sequence.

2. A control system as in claim 1 including a manually actuable normally open switch connected to said pump means and said source of electrical energy, whereby upon actuation of said manually actuable switch said pump means is continuously operated, and means connected to said heating elements for providing a visual indication of the energization of said electric heating elements.

References Cited
UNITED STATES PATENTS

| | | | |
|---|---|---|---|
| 1,256,950 | 2/1918 | Thompson et al. | 335—121 |
| 2,450,399 | 9/1948 | Sheidler | 219—453 |
| 2,498,054 | 2/1950 | Taylor | 219—493 X |
| 2,553,212 | 5/1951 | Rouis et al. | 219—321 |
| 2,700,505 | 1/1955 | Jackson | 219—493 X |
| 3,031,559 | 4/1962 | Harmon et al. | 219—321 X |

ANTHONY BARTIS, *Primary Examiner.*